United States Patent
Aoyagi et al.

(10) Patent No.: US 7,137,300 B2
(45) Date of Patent: Nov. 21, 2006

(54) PARYLENE CAPACITIVE ACCELEROMETER UTILIZING ELECTRICAL FRINGING FIELD SENSING AND METHOD OF MAKING

(75) Inventors: Seiji Aoyagi, Suita (JP); Yu-Chong Tai, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/798,731

(22) Filed: Mar. 10, 2004

(65) Prior Publication Data

US 2004/0239341 A1 Dec. 2, 2004

Related U.S. Application Data

(60) Provisional application No. 60/455,964, filed on Mar. 19, 2003.

(51) Int. Cl.
*G01P 15/125* (2006.01)
*G01P 15/00* (2006.01)
*H01G 7/00* (2006.01)

(52) U.S. Cl. .............................. 73/514.32; 73/514.36; 361/280

(58) Field of Classification Search .............. 73/514.32, 73/514.36; 361/280; 438/379
See application file for complete search history.

(56) References Cited

U.S. PATENT DOCUMENTS 4,814,691 A 3/1989 Garbini et al.
5,982,608 A * 11/1999 Kalnitsky et al. ............ 361/288
6,110,791 A * 8/2000 Kalnitsky et al. ............ 438/379

FOREIGN PATENT DOCUMENTS

WO   WO 9801761 A2 *  1/1998

OTHER PUBLICATIONS http://www.alps.co.jp/e/technology/03/2002/sep/2.htm, Capacitive Glide Point, pp. 1 to 4, printed May 27, 2004.
Analog Devices homepage, http://www.analog.com/Root/sitePage/mainSectionHome/0,2130,level4%3D%252, IMEMS Accelerometers, printed May 24, 2004.
Baxter, "Capacitive Sensors", IEEE Press, pp. 29-31, (1997).
Baxter, "Capacitive Sensors", pp. 1-17, (2000).
Kovacs, Micromachined Transducers Sourcebook, McGraw-Hill, pp. 219-221, 225-237, and 333-356 (1998).
Shigematzu et al., A Single-CHIP Fingerprint Sensor and Identifier, IEEE Journal of Solid-State Circuits, vol. 34, No. 12, pp. 1852-1859, (1999).
Suzuki et al., A 10-24 Element High-Performance Silicon Tactile Imager, Trans. Electron Devices, vol. 37, pp. 1852-1860 (1990).

(Continued)

*Primary Examiner*—Charles Garber
*Assistant Examiner*—Tamiko Bellamy
(74) *Attorney, Agent, or Firm*—Townsend and Townsend and Crew LLP

(57) ABSTRACT

An accelerometer device comprises a dielectric seismic mass separated by a gap from an underlying comb-shaped planar capacitor. The principle for measuring acceleration detecting capacitance change according to movement of the dielectric mass in the fringe electrical field. This measuring principle is verified by FEM simulation. The simple structure of the accelerometer device allows the polymer Parylene to be used as the proof mass, greatly simplifying the technology by requiring only surface micromachining. Prototype accelerometers are fabricated and calibrated with the aid of off-chip capacitive readout IC.

9 Claims, 11 Drawing Sheets

OTHER PUBLICATIONS

Spangler et al., ISAAC-Integrated Silicon Automotive Accelerometer, Proc. Transducers '95, pp. 585-588 (1995).

Wang et al., Gas-Phase Silicon Etching with Bromine Trifluoride, Proc. Transducers '97, pp. 1505-1508 (1997).

Yang et al., Numerical Simulation of Compressible Squeezed-Film Damping, Proc. Solid-State Sensor and Actuator Workshop, pp. 76-79 (1996).

Yazdi et al., Micromachined Inertial Sensors, Proc. IEEE, vol. 86, pp. 1640-1659 (1998).

* cited by examiner

FIG.2(b) Example of simulation result

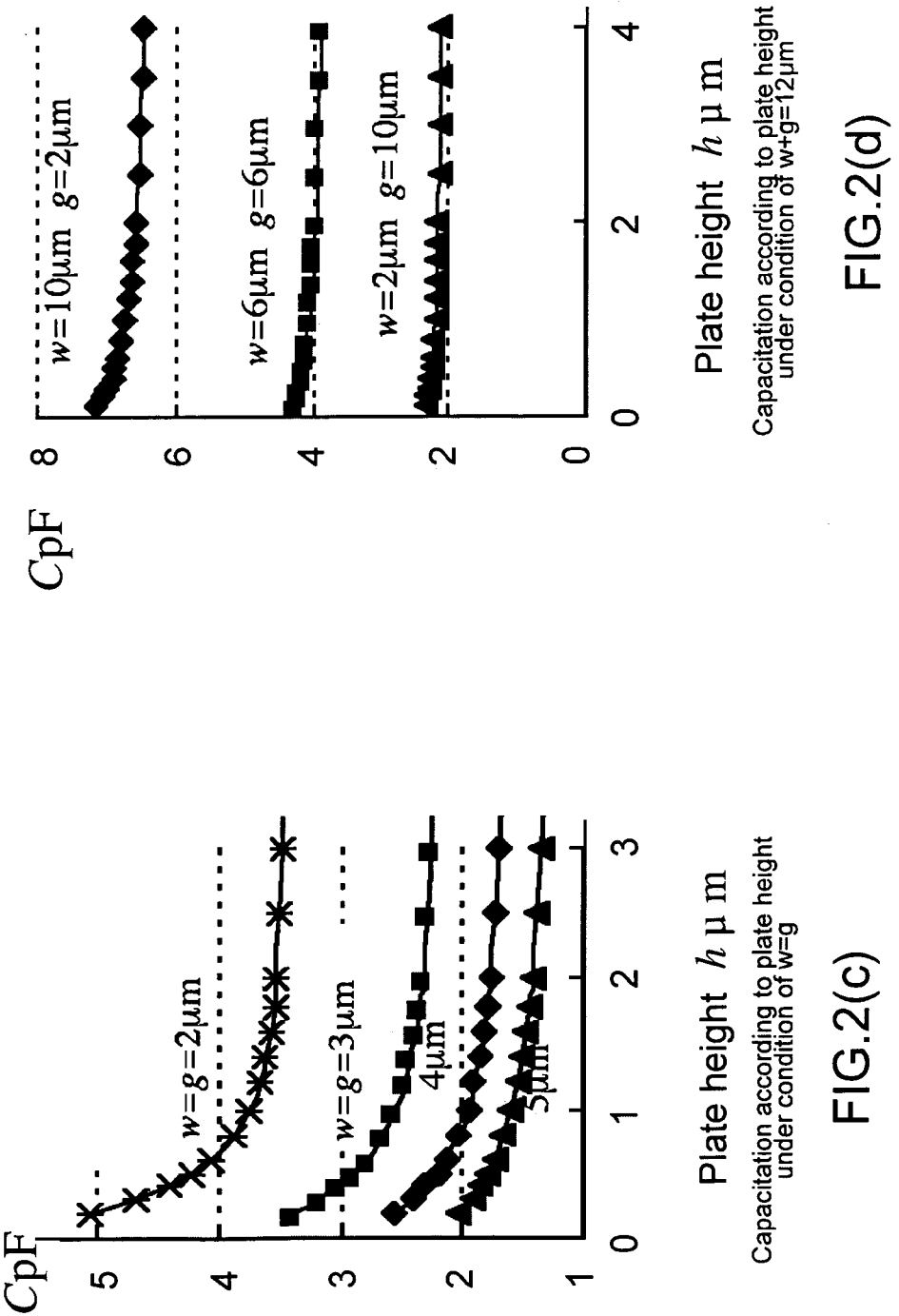

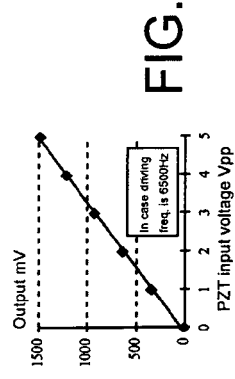
FIG. 7
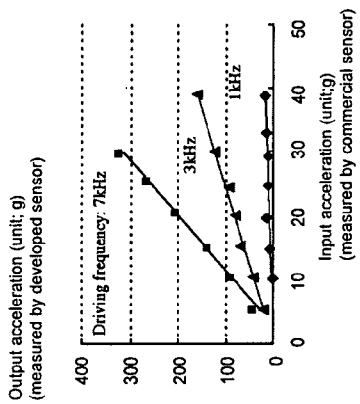
FIG. 8
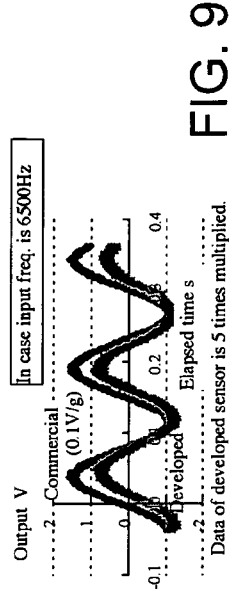
FIG. 9
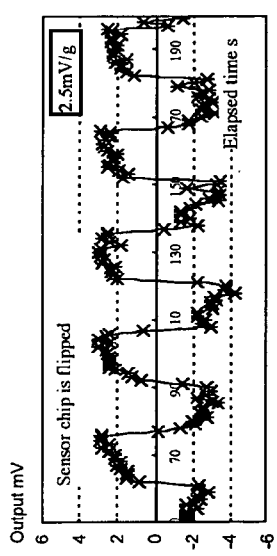
FIG. 5
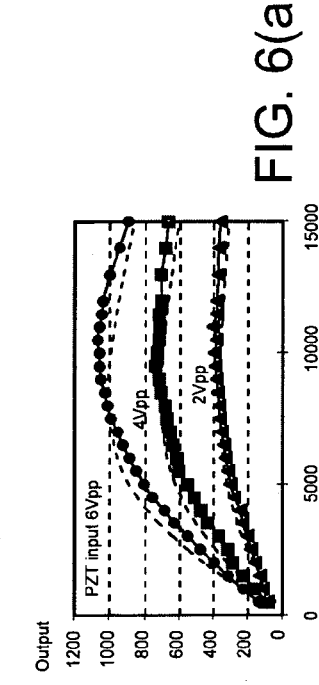
FIG. 6(a)
FIG. 6(b)
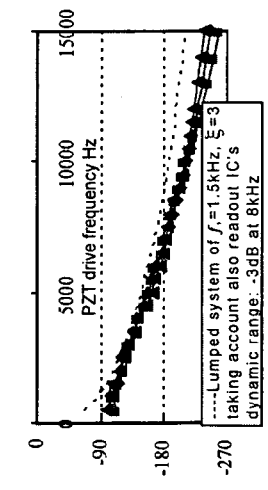

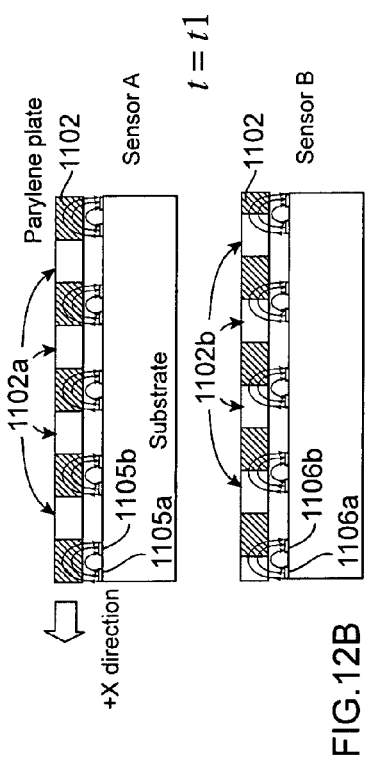
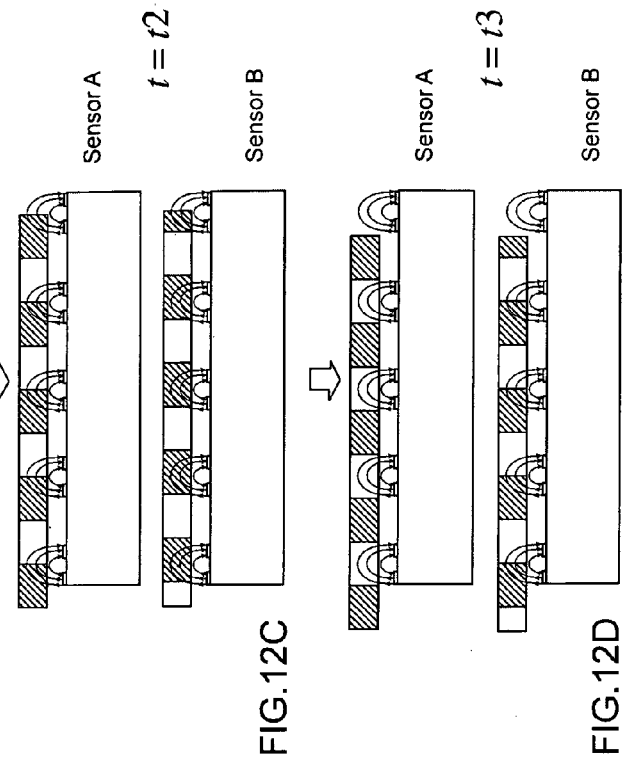
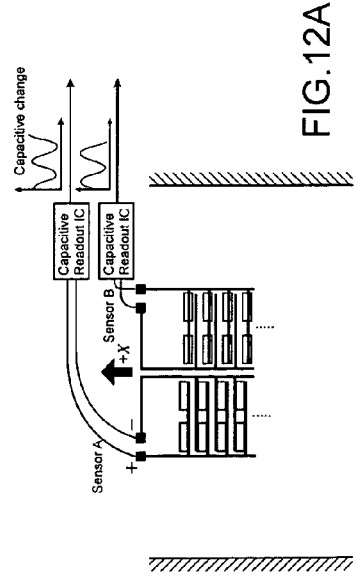
FIG.12A
FIG.12B
FIG.12C
FIG.12D
FIG.12E
FIG.12F

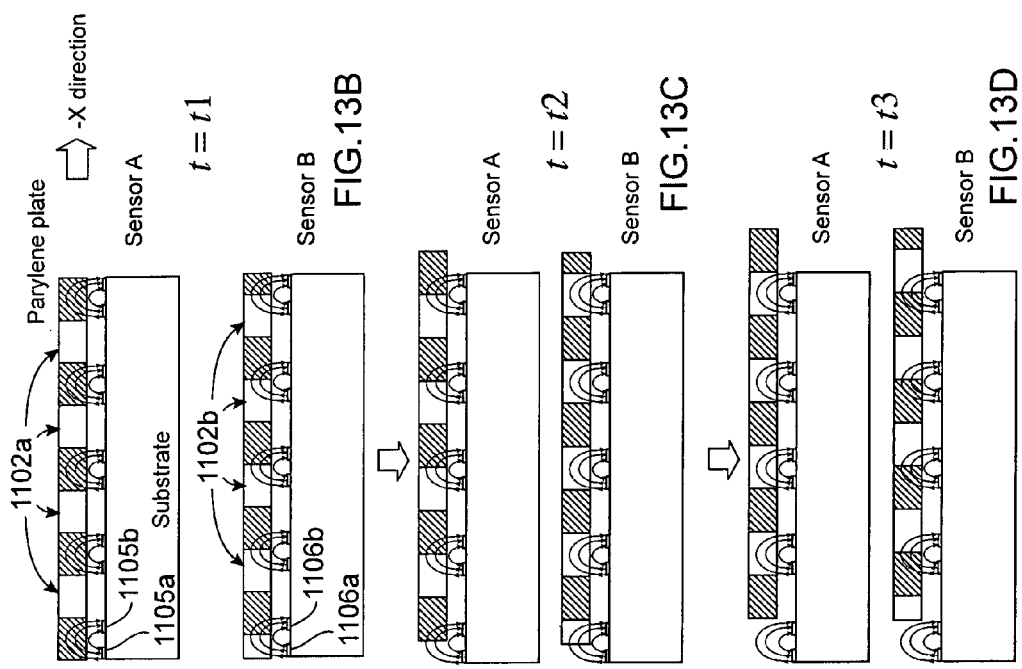
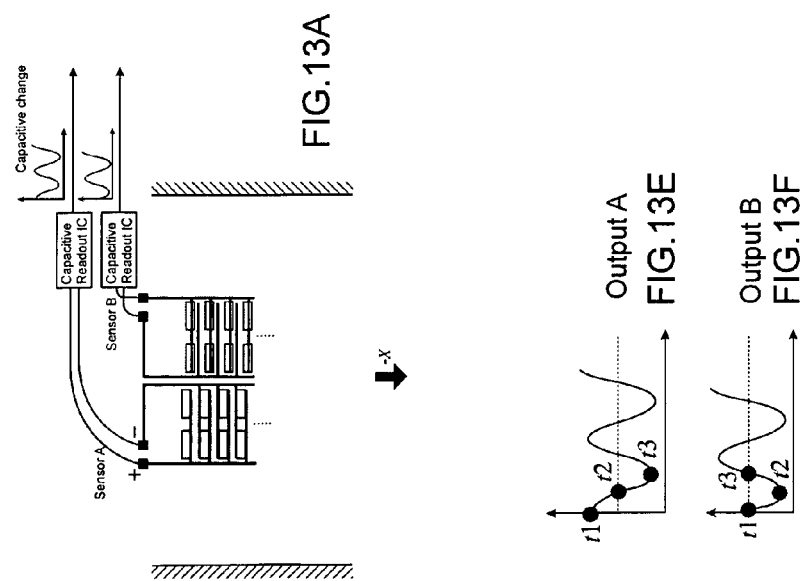

PARYLENE CAPACITIVE ACCELEROMETER UTILIZING ELECTRICAL FRINGING FIELD SENSING AND METHOD OF MAKING

CROSS-REFERENCES TO RELATED APPLICATIONS

This application claims priority to U.S. Provisional patent application No. 60/455,964 filed Mar. 19, 2003, commonly assigned, incorporated by reference herein for all purposes.

STATEMENT AS TO RIGHTS TO INVENTIONS MADE UNDER FEDERALLY SPONSORED RESEARCH OR DEVELOPMENT

Work described herein has been supported, in part, by the NSF Center for Neuromorphic Systems Engineering at the California Institute of Technology (Award No. EEC-9402726). The United States Government may therefore have certain rights in the invention.

BACKGROUND OF THE INVENTION

Various types of capacitive accelerometer have been proposed and commercialized, see for example Yazdi et al., "Micromachined Inertial Sensors", Proc. IEEE, Vol. 86, pp. 1640–1659 (1998). However, many conventional sensors for vertical acceleration detection comprise two facing electrodes, requiring a wafer bonding process. See for example Spangler and Kemp, "ISAAC-Integrated Silicon Automotive Accelerometer", Proc. Transducers'95, pp. 585–588 (1995); and Suzuki et al., "A 1024-Element High-Performance Silicon Tactile Imager", Trans. Electron Devices, Vol. 37, pp. 1852–1860 (1990).

An example of such a conventional accelerometer architecture including facing electrodes is shown in FIG. 1(a). Conventional accelerometer device 100 comprises seismic mass 102 supported by support beams 104 over substrate 106. The underside of seismic mass 102 bears a first electrode 108, and the surface of substrate 106 bears second electrode 110. Acceleration in the z-direction is indicated by a change in position of seismic mass 102 relative to substrate, and specifically by a change in the capacitance exhibited by the capacitor comprising plates 108 and 110 separated by gap 112.

Devices for detecting lateral acceleration typically comprise high-aspect ratio beams and comb fingers fabricated by deep reactive ion etching (DRIE) techniques, for example as shown at http://www.analog.com/technology/mems/accelerometers.

While the above-referenced conventional accelerometer devices are effective, improved accelerometer devices and techniques for manufacturing such improved accelerometer devices are highly desirable.

BRIEF SUMMARY OF THE INVENTION

According to the present invention, techniques for micro fabrication are provided. More particularly, the invention provides a method and device for manufacturing an accelerometer.

In accordance with one embodiment of the present invention, an accelerometer device comprises a dielectric seismic mass separated by a gap from an underlying comb-shaped planar capacitor. The principle for measuring acceleration detecting capacitance change according to movement of the dielectric mass in the fringe electrical field. This measuring principle is verified by FEM simulation. The simple structure of the accelerometer device allows the polymer Parylene to be used as the seismic mass, greatly simplifying the technology by requiring only surface micromachining. Prototype accelerometers are fabricated and calibrated with the aid of off-chip capacitive readout IC.

An embodiment of a sensor in accordance with the present invention comprises, a substrate bearing a first electrode coplanar with a second electrode. A dielectric seismic mass overlies and is separated from the electrodes by a gap. A resulting capacitor structure is formed by the first and the second electrodes separated by the dielectric seismic mass.

An embodiment of a method in accordance with the present invention for fabricating a sensor, comprises, patterning a pair of electrodes in a plane defined by a substrate surface, and forming a sacrificial material over the electrodes and the substrate. A dielectric layer is patterned over the sacrificial material to form a block anchored to surrounding material by a beam. The sacrificial material is removed to leave the block supported by the beams over the electrodes.

An embodiment of a method in accordance with the present invention for sensing movement of a seismic mass, comprises, providing a seismic mass comprising dielectric material overlying and separated by a gap from first and second coplanar electrodes. Fringe capacitance is detected between the first and second electrodes as a rate of occupation of space by the dielectric material changes.

Various additional objects, features and advantages of the present invention can be more fully appreciated with reference to the detailed description and accompanying drawings that follow.

BRIEF DESCRIPTION OF THE DRAWINGS

FIG. 2(b) is a cross-sectional view showing a simulation result.

FIG. 2(c) plots capacitance versus plate height for one simulated plate condition.

FIG. 2(d) plots capacitance versus plate height for another simulated plate condition.

FIG. 5 plots output voltage versus time for an accelerometer subjected to one set of testing conditions.

FIG. 6(a) plots output voltage versus drive frequency for the accelerometer.

FIG. 6(b) plots phase versus drive frequency.

FIG. 7 plots output voltage versus input voltage for the accelerometer.

FIG. 8 plots output acceleration versus input acceleration.

FIG. 9 plots output voltage versus time for a conventional accelerometer versus a design in accordance with an embodiment of the present invention.

FIG. 12A shows a simplified schematic view of the alternative embodiment of FIG. 11 experiencing acceleration in a first direction.

FIGS. 12B–D shows cross-sectional views of the sensor of FIG. 12A at successive points in time.

FIGS. 12E–F plot voltage versus time for acceleration in the first direction.

FIG. 13A shows a simplified schematic view of the alternative embodiment of FIG. 11 experiencing acceleration in a direction opposite that shown in FIG. 12A.

FIGS. 13B–D shows cross-sectional views of the sensor of FIG. 13A at successive points in time.

FIGS. 13E–F plot voltage versus time for acceleration in the opposite direction shown in FIG. 12A.

DETAILED DESCRIPTION OF THE INVENTION

According to the present invention, techniques for micro fabrication are provided. More particularly, the invention provides an accelerometer device and a method for manufacturing that device.

Figure 1A:
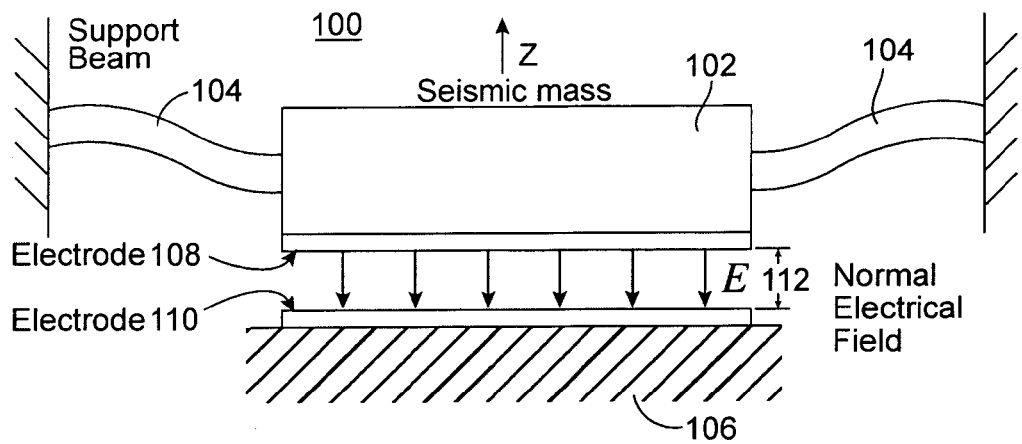
FIG. 1(a) shows a simplified cross-sectional view of an accelerometer of conventional design.

In the well known case of a capacitor comprising facing electrodes (for example as is shown in FIG. 1(a)) capacitance is proportional to the dielectric constant of the material between the two electrodes. Specifically, the capacitance of the conventional parallel plate capacitor structure of FIG. 1(a) is represented by Equation (1):

$$C = \frac{\varepsilon S}{d}, \text{ where} \tag{1}$$

C=capacitance;
$\in$=dielectric constant;
S=area of electrode; and
d=gap between electrodes.

The general principle of capacitance detection according to the change of S or d is well known and utilized for commercial capacitive sensors. Also, the general principle of capacitance detection according to movement of the dielectric slab between two electrodes is described, for example, by G. T. A. Kovacs in "Micromachined Transducers Sourcebook", McGraw-Hill, pp. 219–221 (1998), incorporated by reference herein for all purposes.

Figure 1B:
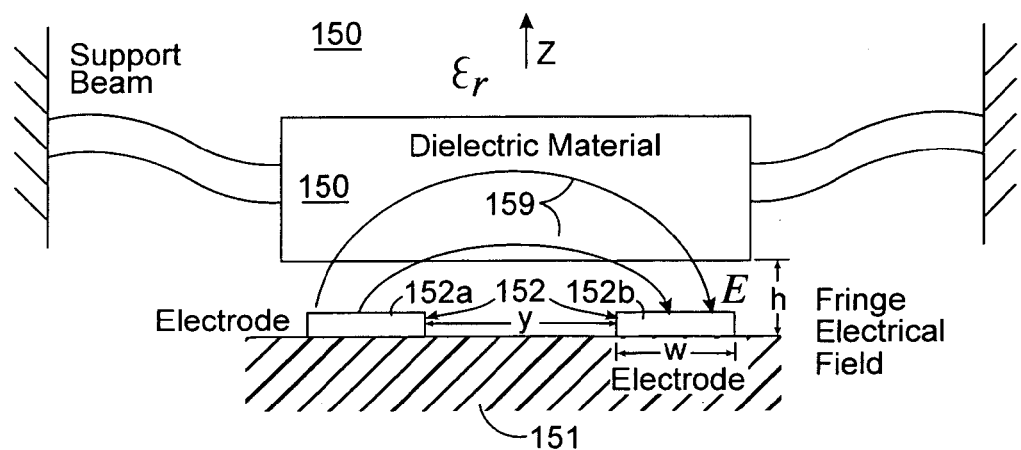
FIG. 1(b) shows a simplified cross-sectional view of one embodiment of an accelerometer in accordance with the present invention.

By contrast, FIG. 1(b) shows a simplified cross-sectional view of one embodiment of an accelerometer device in accordance with the present invention. Accelerometer 150 of FIG. 1(b) comprises dielectric seismic mass 150 and an underlying comb-shaped planar capacitor 152 formed on substrate 151. Planar capacitor 152 comprises elements 152a and 152b of width w, separated from each other by distance g. Dielectric seismic mass 150 is separated from the substrate by air gap h.

Referencing FIG. 1(b), element 152a and 152b comprise adjacent metal electrodes. Electrode 152a is connected to a power source of a positive voltage level, and electrode 152b is connected to ground (zero) level. As a result of this configuration, fringe electrical field 159 is generated from electrode 152a to electrode 152b, with positive charge occurring at electrode 152a, and negative charge occurring at 152b. This charge difference in turn creates a capacitor between electrodes 152a and 152b Accelerometer device 150 of FIG. 1(b) utilizes detection of capacitance change according to movement of the dielectric mass in the fringe electrical field. Change in capacitance according to absorption of the fringe electrical field by approach of a conductive material, such as a human finger, has previously been utilized in touch pads and fingerprint sensors, see for example http://www.alps.cojp/e/technology/03/2002/sep/2.htm, and http://www-micro.deis.unibo.it/~tartagni/Finger/FingerSensor.html.

Figure 1C:
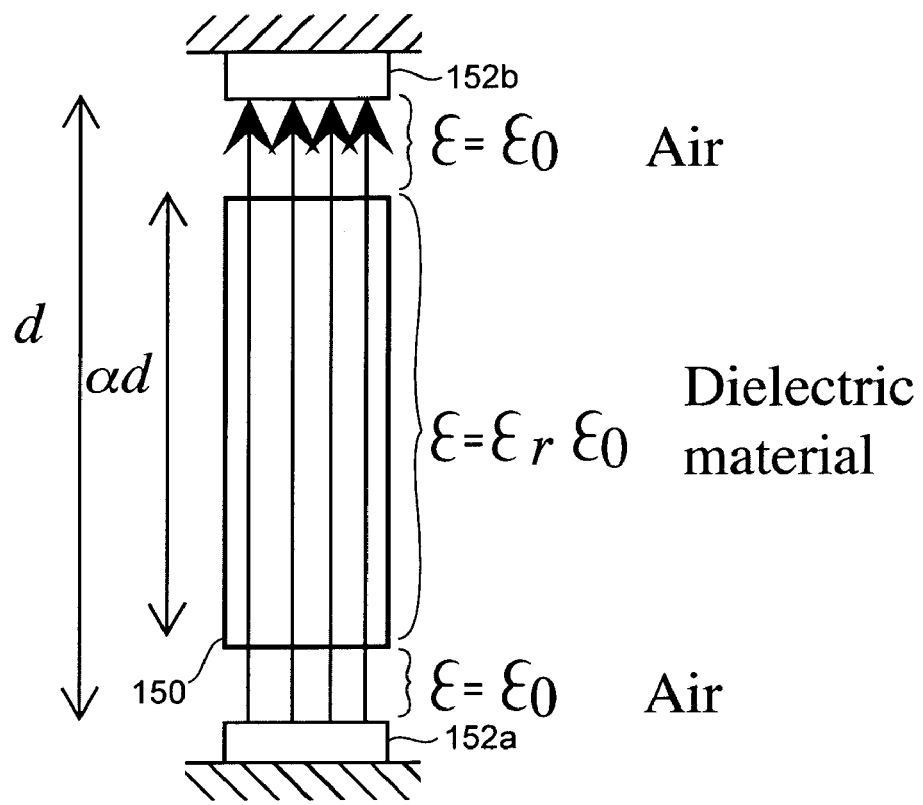
FIG. 1(c) shows a schematic cross-sectional view of the embodiment of FIG. 1(b).

Measurement of changes in fringe capacitance in FIG. 1(b) in accordance with the present invention, may be better understood with reference to FIG. 1(c), which reorients the curved electrical field of FIG. 1(b) into a corresponding straight line. As the height of material 150 changes relative to electrodes 152a and 152b, the rate of space occupation ($\alpha$) of material 150 within the overall electrical field changes, altering the total capacitance.

Both air and dielectric material 150 are present in the curved fringe electrical field between electrodes 152a and 152b. The combination of air and material 150 may be considered as comprising a single equivalent dielectric coefficient.

In qualitative terms, assuming the dielectric constant of material 150 is larger than that of air, the capacitance exhibited by the device would increase with decreased height (as the equivalent dielectric constant would increase). Conversely, the capacitance exhibited by the device would decrease with increased height (as the equivalent dielectric constant decreases).

In quantitative terms, the dielectric constant of air, $\in_o = 8.85 \times 10^{-12}$ F/m. The dielectric constant of Parylene relative to air, $\in_r = 3.15$. Thus the absolute dielectric constant of Parylene may thus be represented as $\in_o \in_r$. Capacitance for the structure shown in FIG. 1(c) may be represented by Equation (2) below:

$$C = \frac{\varepsilon_0 S}{d} \cdot \frac{1}{1 - \alpha + \frac{\alpha}{\varepsilon_r}}, \text{ where} \tag{2}$$

Figure 1D:
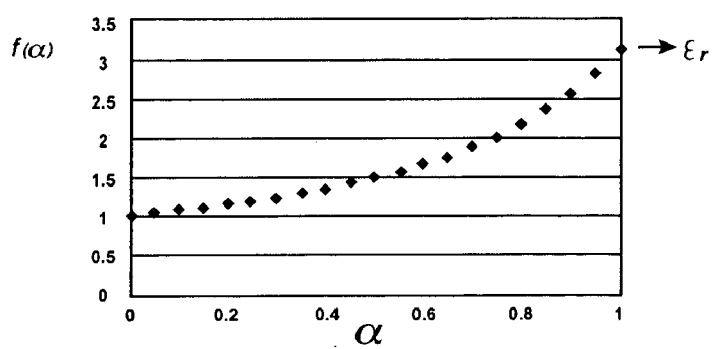
FIG. 1(d) plots f($\alpha$) vs. $\alpha$ for a Parylene seismic mass.

$\in_0$=dielectric constant of air;
S=area of electrode;
d=distance between electrodes;
$\alpha$=space occupying rate of dielectric material; and
$\in_r$=dielectric constant of Parylene.
The function $$f(\alpha) = \frac{1}{1 - \alpha + \frac{\alpha}{\varepsilon_r}}$$

may be defined as equivalent relative dielectric constant ($\hat{\in}_r$). FIG. 1(d) plots f(α) versus α for an arbitrary fixed $\in_r$. In FIG. 1(d), $\in_r$=3.15 is the value for Parylene. FIG. 1(d) indicates that as α increases, $\hat{\in}_r$ increases from 1 to $\in_r$, and would be the same for any $\in_r$ value.

FEM Simulation

Theoretical certification of the fringe capacitance measuring principle is now presented. The fringe capacitance changes as the displacement between the seismic mass and the substrate changes as shown in FIG. 1(b). However, even first order approximation of capacitance is difficult, since intensity of the fringe electrical field distributes nonlinearly according to position.

Considering this circumstance, FEM (Finite Element Method) simulation is carried out. FEMLAB, produced by Comsol, Inc. of Burlington, Mass. may be used as the FEM software.

Figure 2A:
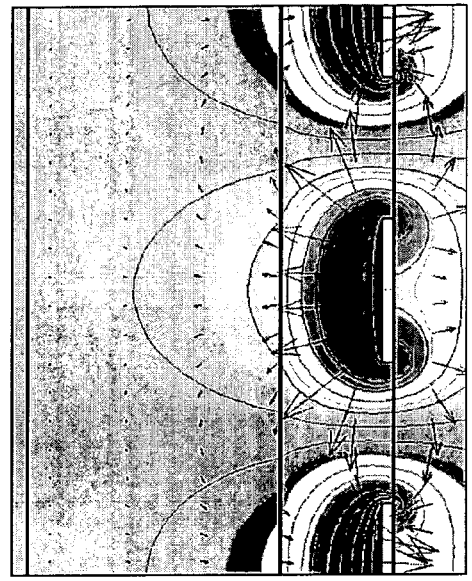
FIG. 2(a) shows a schematic diagram of a simulation condition.
Figure 2A:
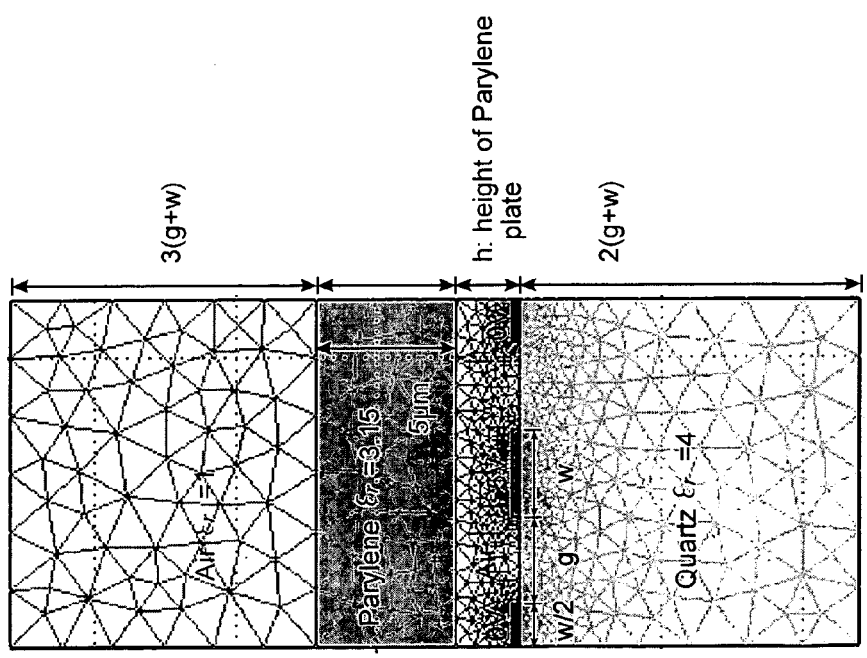

Simulation condition is shown in the simplified view of FIG. 2(a). Analyzed space is meshed into 1818 elements. Taking account of symmetry, 2D (2-dimensional) model is applied. In order to decrease the capacitance formed inside the substrate, $SiO_2$ is used as the substrate material instead of Si. By changing the height of Parylene seismic mass, distribution of electrical field are simulated and total capacitance is calculated according to equation (3) below.

$$C = \frac{2W_e}{V^2} = \frac{2}{V^2}\int_S 0.5(E_x D_x + E_y D_y) dS, \text{ where:} \quad (3)$$

$W_e$=electrical energy;
V=applied voltage;
S=Area of electrode;
$E_x$=X component of electrical field strength at one meshed element;
$D_x$=X component of dielectric flux density at one meshed element;
$E_y$=Y component of electrical field strength at one meshed element; and
$D_y$=Y component of dielectric flux density at one meshed element.

Using this value of analyzed space, the total capacitance of a 1 mm×1 mm plate is calculated.

An example of the simulation results of electrical field distribution is shown in FIG. 2(b). The electrical field strength is the largest in the vicinity of the electrode and rapidly decreases radially as the distance from the electrode increases.

Simulation results of the relationship between gap distance and capacitance under the condition that w=g, where w is the width of the electrode, and g is the gap length between each two electrodes, are shown in FIG. 2(c). The capacitance is a function of the movement of the seismic mass plate, which certifies the measuring principle of the proposed method. The smaller the width and the gap length of the electrodes, the larger the base capacitance and the better the sensitivity.

Simulation results under the condition that the ratio of w/g is changed, while keeping the sum of w+g to 12 μm, are shown in FIG. 2(d). As the ratio of w/g is larger, bigger capacitance is obtained. Due to the limitation of photolithography, in this work the values of w and g are 3 μm.

Design and Fabrication

Mechanical Design and Specification

As the first prototype design, the seismic-mass plate size is set to 1 mm×1 mm×5 μm. The supporting beam size is designed so as that the resonant frequency is to be 1.5 kHz, which is equivalent to a mechanical sensitivity (mass plate movement per gravity acceleration) of 0.1 μm/g.

Taking account of linearity of sensitivity and stiction problem, the original displacement between the mass and the substrate is set to a rather large value of 2.2 μm. Considering both the gradient of curve in FIG. 2(c), and mechanical sensitivity as mentioned above, the theoretical electrical sensitivity is $1.5 \times 10^{-2}$ pF/g.

Fabrication Process

Figure 3A:
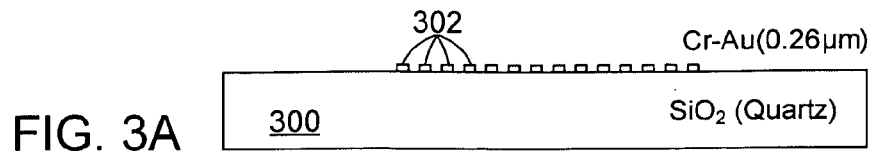
FIGS. 3A–G show simplified cross-sectional views of a process flow for fabricating the accelerometer.

The fabrication process flow is shown in simplified cross-sectional view in FIGS. 3A–G. In FIG. 3A a quartz ($SiO_2$) wafer 300 is prepared as the substrate. Photoresist is spin-coated and patterned for comb-shaped electrode. After that, Cr (0.06 μm) and Au (0.2 μm) bilayer 302 is thermally evaporated for deposition into exposed regions, and followed by a lift off process removing the patterned photoresist.

Figure 3B:
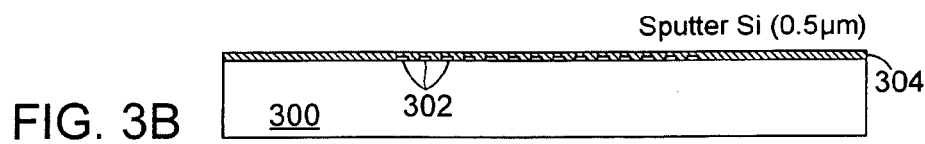

In FIG. 3B, amorphous silicon (a-Si) 304 (0.5 μm) is sputtered as the sacrificial layer 304. This sacrificial a-Si layer is to be dry-etched by using $BrF_3$ gas in the releasing process, which is effective for preventing stiction between the seismic mass plate and the substrate. See Wang et al., "Gas-Phase Silicon Etching with Bromine Trifluoride", Proc. Transducers '97, pp.1505–1508 (1997), incorporated by reference herein for all purposes.

Figure 3C:
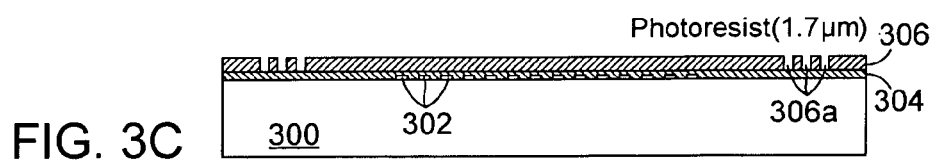

Since thick sputtered silicon is liable to cracking, FIG. 3C shows that photoresist layer 306 (1.7 μm) is spin-coated over silicon layer 304 to serve as an additional sacrificial layer, later to be wet-etched in the releasing process. Photoresist 306 is patterned to play the role of the mask for later etching of the amorphous silicon layer. In accordance with certain embodiments the combined height of the sacrificial a-Si and photoresist materials may define a gap of between about 1–5 μm.

FIG. 3C shows patterning of sacrificial photoresist 306 to reveal gaps 306a. Gaps 306a defines the location of the slots that are later to be formed, through which feet of the anchor portion of the Parylene material will contact and adhere to the substrate, and be supported thereby.

Figure 3D:
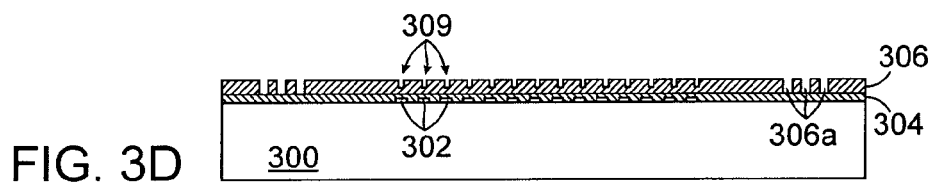

FIG. 3D shows partial exposure of the sacrificial photoresist 306 during patterning to create dimples 309. This partial exposure is accomplished by lowering the power of UV-light, followed by developing to remove only the portion of partially-exposed resist. As explained in detail below, dimples 309 provide a mold for the later formation of bumps on the underside of the Parylene seismic mass.

Figure 3E:
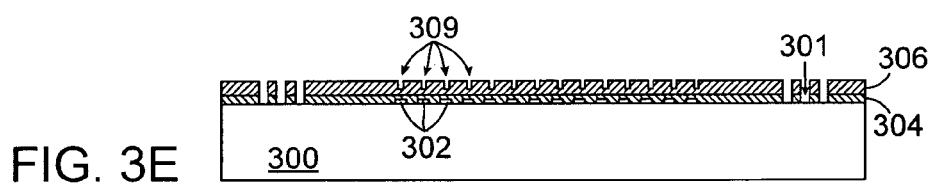

FIG. 3E shows etching with $SF_6+O_2$ plasma, of underlying a-Si layer 304 in regions revealed by patterned sacrificial photoresist 306. This etching step forms slots 301 which allow the Parylene material forming the beams and mass supported thereby, to contact, adhere to, and be supported by, the underlying substrate.

Figure 3F:
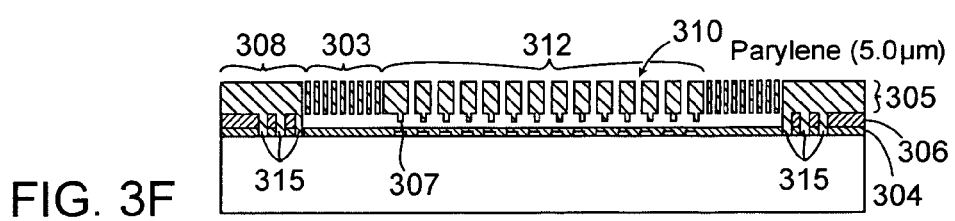

Specifically, FIG. 3F shows deposition of Parylene layer 305 (5 μm) over photoresist 306 to form seismic mass 312, surrounding anchoring material 308, and beams 303 connecting mass 312 with anchors 308. Anchor 308 contacts substrate 300 to support beam 303 and mass 312. In accordance with various embodiments, the thickness of the deposited Parylene layer 305 may range from between about 5–20 μm.

It is possible to fabricate an accelerometer structure utilizing a deposited Parylene layer exhibiting a large area of contact with the underlying substrate, which conforms to the profile of the raised sacrificial features. However, the point of contact between the beams and the surrounding anchor material represents a region of concentrated mechanical stress. Therefore, it is desirable that the height of the Parylene layer 305 at anchor 308 and mass part 312 be substantially the same.

Accordingly, in the embodiment shown in FIG. 3F, the area of contact between the Parylene and the underlying substrate is limited to feet 315, with Parylene deposition sufficiently conformal to fill slots 301. Deposition of a planar Parylene layer 305 in the manner shown in FIG. 3F thus allows the height of anchor 308 to remain at relatively the same height as beam 303 and mass 312, thereby reducing mechanical stress in the deposited Parylene layer 305.

FIG. 3F also shows that Parylene material formed in dimples 309 of photoresist 306 in turn creates bumps 307. Bumps 307 protrude from the underside of the seismic mass and provide for reduced contact area between the seismic mass and the underlying substrate/electrodes. Thus even if the seismic mass actually touches the underlying substrate (i.e. during fabrication by removal of the sacrificial layer, or during operation in response to a particularly large acceleration), bumps 307 may help prevent stiction by reducing the area of contact area between the Parylene and the underlying substrate/electrodes.

FIG. 3F also shows etching of the deposited Parylene by $O_2$ plasma to form holes 310 in the mass plate 312. During fabrication of the accelerometer device, holes 310 expose the sacrificial layers for removal by etching. During operation of the accelerometer device, holes 310 reduce air damping by promoting circulation of air to regions underlying the seismic mass. In certain embodiments, the Parylene plate may be perforated by holes having a dimension of about 10×50 μm, spaced at an interval of between about 10–50 μm.

Figure 3G:
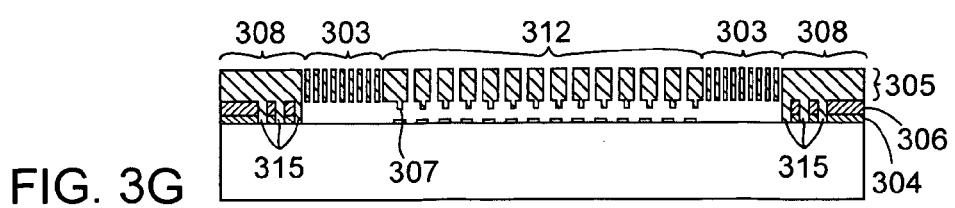

In FIG. 3G, the underlying sacrificial photoresist is wet-etched by ST-22 stripper. The underlying sacrificial amorphous silicon is then dry-etched by $BrF_3$ gas to finally release the mass part 312 and beam part 303.

Fabrication Result

Figure 4A:
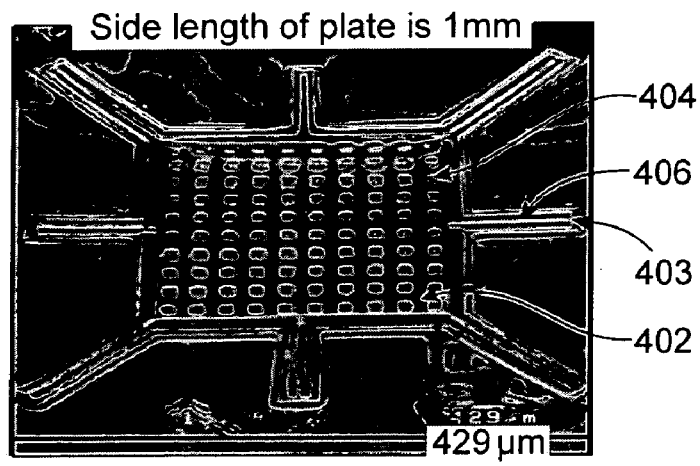
FIG. 4(a) shows a SEM plan view of an embodiment of an accelerometer in accordance with the present invention.
Figure 4B:
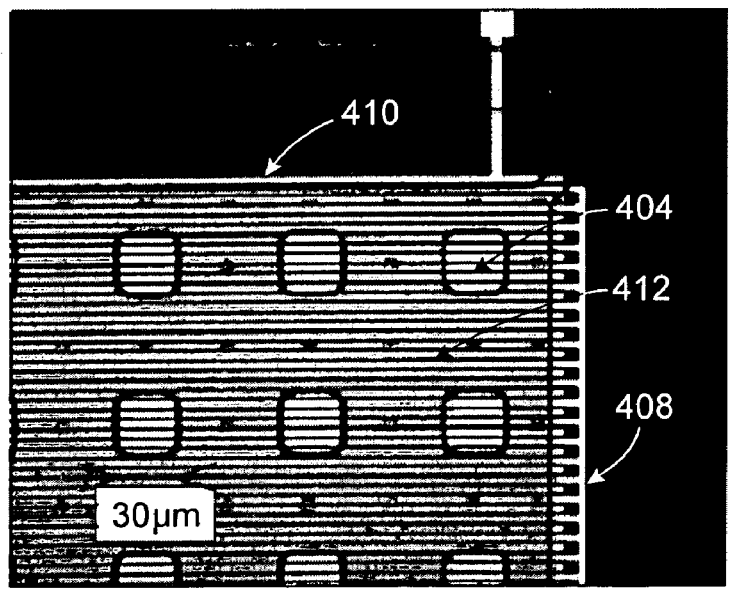
FIG. 4(b) shows an enlarged SEM plan view of an embodiment of the accelerometer of FIG. 4(b).

Micrographs of an example of fabricated device are shown in plan view in FIGS. 4(a) and 4(b) (enlarged). One end of eight beams 406 sustain seismic mass plate 402. The opposite end of the eight beams 406 are fixed to anchor part 403. Square holes 404 allow etching underneath sacrificial layers, and also serve to reduce air damping. In FIG. 4(b), 3-3 μm comb shaped gold electrodes 408 and 410 are visible, along with small bumps 412 underlying the mass plate.

Structures are touched and moved by a needle of a probe station. Under the microscope, an optical fringe is generated. Also, the needle easily goes under the structure, evidencing that the microfabricated detector structure is suspended and stiction does not occur.

Evaluation of Performance

Static Performance

The capacitance change is detected with the aid of a capacitive readout IC (MicroSensors Inc. model MS3110, Irvine, Calif.), which converts capacitance change into voltage. The dynamic range of this IC is −3 dB at 8 kHz. Considering that the designed resonant frequency is 1.5 kHz, the dynamic range of the sensor chip comprised of the fabricated device and IC, is about DC-1.5 kHz.

FIG. 5 shows the result of ±1 g detection in which the sensor chip is flipped upside down repeatedly. The observed sensitivity is ~2.5 mV/g, which is equivalent to $7.4\times10^{-4}$ pF/g. The observed sensitivity is thus about 1/20 times smaller than the theoretical sensitivity, a difference believed to be attributable to the tensile stress in Parylene.

This low observed sensitivity also degrades the signal-to-noise ratio. Since the readout IC's programmable magnification is set to the relatively high value of 3.4 V/pF to compensate for sensitivity, the noise floor of the voltage output takes the relatively large value of 0.1 mV/(Hz)$^{1/2}$, which is equivalent to $4\times10^{-2}$ g/(Hz)$^{1/2}$. This noise problem makes it difficult to characterize precisely the sensor performance quantitatively at the moment.

FIG. 5 also shows that the response curve is not purely rectangular, and some drift is observed. Besides low sensitivity of the sensor, the fact that sensor chip is flipped manually and not kept completely fixed in position also contributes to the drift.

Dynamic Performance

Frequency response of the sensor is investigated by shaking it with a piezoelectric actuator, as is shown in FIG. 6. Using the designed resonant frequency, the damping ratio is found to be about three.

Even if many damping holes are set in the mass plate, air damping is still strong. This large damping causes the fact that the gain and phase are not constant according to the input frequency.

However, under the condition that the input frequency is fixed, linearity between the sensor output voltage and input voltage to PZT is achieved as shown in FIG. 7. The sensor is shaken with a magnet shaker (Labworks Inc., model ET-132-2, Costa Mesa, Calif.), of which the acceleration is calibrated by a commercial accelerometer (Endevco Corp., model 256HX-100, San Juan Capistrano, Calif.).

The comparison between output of the embodiment of an accelerometer in accordance with an embodiment of the present invention, and the commercial accelerometer, is shown in FIG. 8. Their absolute values do not coincide with each other. Moreover, their ratio is not constant and depends on the driving frequency of the shaker, reflecting the frequency characteristics shown in FIG. 6 for the instant accelerometer.

However, the linearity between the sensor output and the acceleration input is achieved at each driving frequency. FIG. 9 compares output waveforms from the instant accelerometer design with the conventional commercial accelerometer. These waveforms coincide with each other well.

The measuring principle is verified by FEM simulation. A prototype sensor is fabricated and it is qualitatively confirmed that the capacitance changes according to the dielectric mass movement. However, the problems of small dynamic range, low sensitivity, large drift, large overdamping, etc., are revealed.

As described by Kovacs, "Micromachined Transducers Sourcebook", McGraw-Hill, (1998), incorporated herein by reference for all purposes, theoretically the sensitivity is proportional to expression (2)

$$1/(2\pi f_n)^2 = m/k, \text{ where} \tag{4}$$

$f_n$=resonant frequency of the sensor;

m=mass; and k=beam stiffness.

Figure 10A:
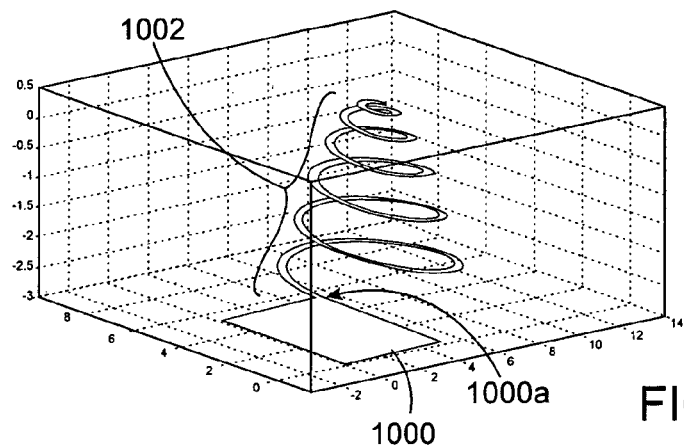
FIG. 10(a) shows a simplified perspective view of an alternative embodiment of an accelerometer in accordance with the present invention.

In order to increase the sensitivity of the device, the resonant frequency $f_n$ may be lowered by employing a long spiral shape beam exhibiting low stiffness (k). FIG. 10(a) shows a perspective view of one such embodiment, wherein seismic mass 1000 is supported at corner 1000a by spiral beam 1002.

Specifically, the stiffness k is lowered as beam length is increased. Considering space limitations, a spiral-shaped beam is efficient as compared with other beam shapes in order to obtain a long beam. For example, in FIG. 10(a), taking account of symmetry, quarter model is employed. Simulated movement of the mass plate using FEM software confirms that the resonant frequency is lowered utilizing a spiral-shaped beam.

Figure 10B:
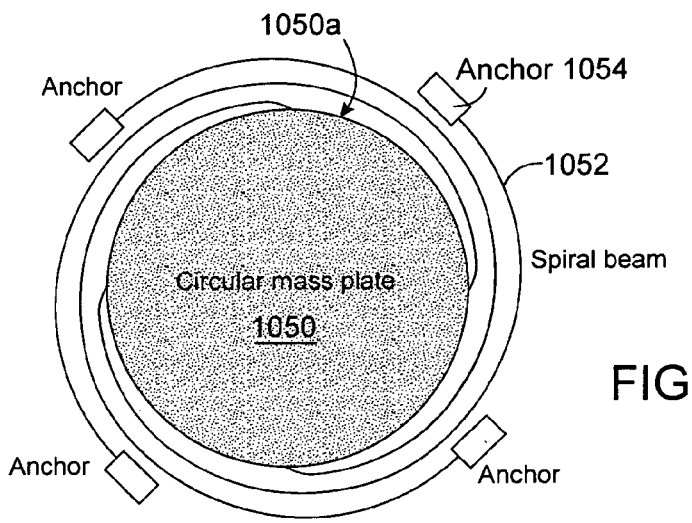
FIG. 10(b) shows a simplified plan view of another alternative embodiment of an accelerometer in accordance with the present invention.
Figure 10C:
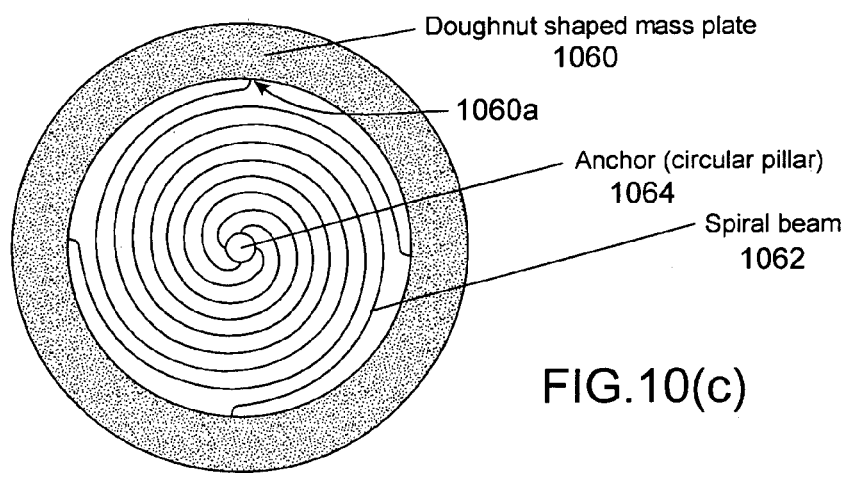
FIG. 10(c) shows a simplified plan view of still another alternative embodiment of an accelerometer in accordance with the present invention.

While the specific embodiment shown in FIG. 10(a) illustrates a mass plate supported by a spiral beam at one corner, the present invention is not limited to this particular configuration. FIGS. 10(b) and 10(c) show simplified plan views of alternative embodiments sensor designs in accordance with the present invention utilizing other spiral beam shapes.

In the embodiment shown in FIG. 10(b), outer edge 1050a of circular mass plate 1050 is supported by arcing beams 1052 fixed to anchors 1054. In the embodiment shown in FIG. 10(c), inner edge 1060a of doughnut-shaped mass plate 1060 is supported by arcing beams 1062 fixed to central anchor 1064.

As compared with four-corner spiral beam embodiment shown in FIG. 10(a), the spiral beams of FIGS. 10(b) and 10(c) are preferable, as stress concentration is reduced by the gentle curvature of the supporting beams. Specifically, the beams can be designed to occupy a larger area, without being confined to the corner space of FIG. 10(a).

Returning to the embodiment shown in FIG. 1(b), provided that damping holes occupy 50% area of the seismic mass plate, the damping ratio is theoretically governed by Equation (5):

$$\zeta = 2.9 \times 10^{-16} (th^3 f_n N)^{-1}; \text{ where} \quad (5)$$

$\zeta$=the damping ratio;
t=the thickness of the plate;
h=the gap between the plate and the substrate;
$f_n$=the resonant frequency of the sensor; and
N=the total number of damping holes.

As described by Yang et al., "Numerical Simulation of Compressible Squeezed-Film Damping", Proc. Solid-State Sensor and Actuator Workshop, pp. 76–79 (1996), incorporated by reference herein for all purposes, the coefficient of $2.9 \times 10^{-16}$ is based on the numerical solution of the Poison's equation.

Increasing h is efficient for reducing air damping, but also may degrade sensitivity. Therefore, increasing t and N may be used to achieve the optimal damping ratio of $\zeta = 1/\sqrt{2}$.

Utilizing the above referenced fringe capacitance technique for detection of acceleration offers a number of advantages over conventional approaches. First, a detection device can be constructed utilizing only a single substrate, which avoids the complex and difficult process of bonding wafers.

The simple structure of the device also allows using the polymer Parylene as the seismic mass, greatly simplifying the fabrication process as compared with conventional devices utilizing polysilicon as the seismic mass. Specifically, polysilicon is typically formed by chemical vapor deposition (CVD) involving complex and expensive equipment, and toxic/hazardous precursors requiring special handling (such as $SiH_4$).

Moreover, etching of polysilicon to fabricate shaped members is generally carried out by reactive ion etching (RIE) or deep reactive ion etching (DRIE) equipment. This (D)RIE equipment is also expensive and utilizes highly reactive gases requiring special handing (such as $SF_6$).

By contrast, systems for depositing Parylene coatings are comparatively inexpensive, and Parylene may be etched to form shaped members utilizing a conventional plasma ashing process, consuming relatively inexpensive and common $O_2$ gas.

In addition, Parylene not only offers good dielectric ($\varepsilon_r = 3.15$) properties, but also offers favorable mechanical properties such as flexibility (Young's modulus ~4 GPa) and non-brittleness, offering the device durability against high-g shock.

Moreover, Parylene can be deposited at room temperature, which allows compatibility with existing CMOS processes utilized to fabricate electrical devices associated with the accelerometer device.

Finally, the pull-in force of sensor shown in FIG. 1(b) is expected to be smaller than that of the conventional facing plate type shown in FIG. 1(a). Specifically, the pull-in force is well known to be proportional to the gradient of the curve of plate height vs. capacitance. For an embodiment of a sensor in accordance with the present invention, FIG. 2(c) shows that the gradient of this curve increases gently, and the gradient is small when the plate height approaches zero.

Conversely, for the conventional facing electrode type sensor, the gradient of the plate height vs. capacitance curve increases very rapidly to infinite value when the plate height approaches zero, and the gradient is correspondingly large. Therefore, a sensor in accordance with embodiments of the present invention exhibits reduced pull-in force, with the low probability of the plate being pulled to contact the substrate.

It should also be noted, however, that sensitivity of the sensor is also proportional to the gradient of the plate height vs. capacitance curve. Thus the reduction in pull-in force should be balanced against sensitivity requirements.

Merely by way of example, the invention has been applied to the manufacture of a polymer based device detecting acceleration in a direction perpendicular to the lane of the electrodes. However, alternative embodiments of the present invention are directed to apparatuses and methods for detecting acceleration in the lateral direction.

Figure 11:
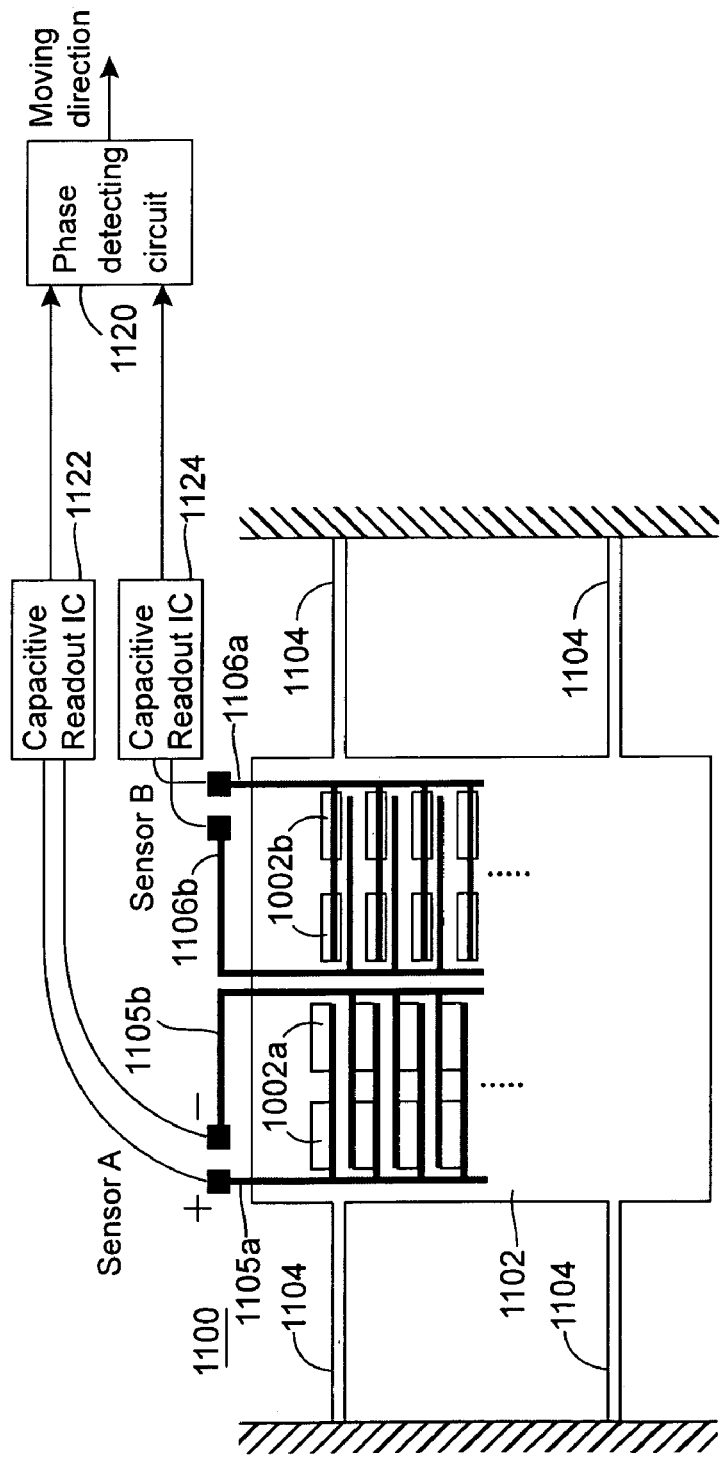
FIG. 11 shows a simplified schematic view of another alternative embodiment of an accelerometer in accordance with the present invention.

FIGS. 11–13F illustrate various views of such a device. FIG. 11 shows a simplified schematic plan view of the lateral accelerometer in a state of rest. Lateral acceleration sensor 1100 comprises dielectric mass plate 1102 suspended by narrow beams 1104 over two pairs of comb-shaped electrodes 1105a–b and 1106a–b comprising separate sensors. Narrow beams 1104 are configured to allow movement of dielectric mass plate 1102 in the horizontal (±X), rather than vertical, direction.

Mass plate 1102 defines two hole arrays 1102a and 1102b overlying electrode pairs 1105a–b and 1106a–b respectively. With horizontal acceleration, mass plate 1102 experiences movement in the lateral direction relative to the underlying electrodes.

Since the holes move horizontally along with the mass plate, the rate of occupation of space by dielectric material (as opposed to occupation of space by air), changes above the comb-shaped electrodes. If changed capacitance of only one of the sensors shown in FIG. 11 is monitored, the magnitude but not the direction of lateral acceleration can be measured.

However, by detecting phase advance or delay between the signals from two different sensors, the direction of acceleration can also be determined. Accordingly, in the embodiment of FIG. 11, electrode pair 1105a–b is in electrical communication with phase detecting circuit 1120 through first capacitive read out integrated circuit 1122, and electrode pair 1106a–b is in electrical communication with phase detecting circuit 1120 through second capacitive read out integrated circuit 1124.

As shown in FIG. 11, hole arrays 1102a and 1102b are positioned relative to one another with a difference of ½ pitch. It should be noted that the pitch for the plus electrode and for minus electrode are equal. But, the pitch for all electrodes is not equal: small and wide are repeated, as shown in FIGS. 12A–D and FIGS. 13A–D.

Specifically, the +/−electrode pairs with the small pitch generate a strong fringe electrical field, while those with the wide pitch generate a weak fringe electrical field, as the strength of the fringe electrical field decreases in proportion to distance between two electrodes. In the embodiment of FIGS. 12B–D and 13B–D, this weak electrical field is neglected and not depicted. The range of the small-pitch electrical field lies within the hole width, which is equal to the width of the plate between adjacent holes.

FIG. 12A shows a simplified schematic view of the alternative embodiment of FIG. 11 experiencing acceleration in a first (+X) direction. FIGS. 12B–D shows cross-sectional views of the device of FIG. 12A at successive points in time (t1–3).

FIGS. 12E–F plot voltage versus time for the sensor of FIG. 12A. Advancement in phase of the signal from the first sensor comprising electrode pair 1105a–b and hole array 1102a, reveals movement in the +X direction.

FIG. 13A shows a simplified schematic view of the alternative embodiment of FIG. 11 experiencing acceleration in a direction (−X) opposite that shown in FIG. 12A. FIGS. 13B–D shows cross-sectional views of the device of FIG. 13A at successive points in time (t1–3).

FIGS. 13E–F plot voltage versus time for the sensor of FIG. 13A. Advancement in phase of the signal from the second sensor comprising electrode pair 1106a–b and hole array 1102b, reveals movement in the −X direction.

If the output voltages of only sensors A and B can be obtained, the range of measurement is basically for the movement of one pitch, as it is unknown how many pitches are crossed. If, however, sinusoidal output zero crossings can be detected and counted, the range of measurement of the device is extended to the limit of plate movement as governed by mechanical stiffness of the supporting beams. Such an embodiment would be expected to exhibit greater sensitivity and permit greater flexibility in designing the device.

While the present invention has been described in connection with a sensor for detecting acceleration, embodiments in accordance with the present invention have a much broader range of applicability. In accordance with one alternative embodiment, a change in ambient pressure or contact force, rather than acceleration, could displace a polymer seismic mass in the vertical direction. Altered fringe capacitance resulting from the changed position of the seismic mass relative to electrodes could in turn be measured to detect pressure change. In accordance with certain embodiments, this pressure change could result from the transmission of sound waves, and be exploited in acoustic applications such as microphones.

It is understood that the examples and embodiments described herein are for illustrative purposes only, and there can be other variations and alternatives. Various modifications or changes in light of the above description thereof will be suggested to persons skilled in the art and are to be included within the spirit and purview of this application and scope of the appended claims.

What is claimed is:

1. A sensor comprising:
   a substrate bearing a first electrode coplanar with a second electrode; and
   a dielectric seismic mass overlying and separated from the electrodes by a gap,
   wherein movement of the seismic mass parallel to the electrode plane alters a rate of occupation of space by the dielectric material in a fringe electric field arising between the electrodes.

2. The sensor of claim 1 wherein the first and second electrodes are comb-shaped.

3. The sensor of claim 1 wherein the dielectric seismic mass comprises Parylene.

4. The sensor of claim 1 wherein the seismic mass is perforated by holes.

5. The sensor of claim 1 further comprising a third electrode separated from a fourth electrode on the substrate, wherein seismic mass defines a first hole between the first and second electrodes, and a second hole between the third and fourth electrodes, the second hole offset in pitch from the first hole.

6. The sensor of claim 1 further comprising a beam in contact with an anchor portion and configured to support the dielectric mass over the electrodes.

7. The sensor of claim 6 wherein the beam exhibits a linear shape.

8. The sensor of claim 6 wherein the beam is configured to accommodate movement of the seismic mass parallel to the electrode plane.

9. The sensor of claim 1 wherein the dielectric seismic mass and the beam comprise integral features of a dielectric layer.

* * * * *